E. H. MILLER.
CALENDAR CALCULATOR.
APPLICATION FILED JAN. 19, 1918.

1,370,220.

Patented Mar. 1, 1921.

Inventor:
Edward H. Miller,
by Hazard and Miller
Atty's.

UNITED STATES PATENT OFFICE.

EDWARD H. MILLER, OF LOS ANGELES, CALIFORNIA.

CALENDAR-CALCULATOR.

1,370,220.  Specification of Letters Patent.  Patented Mar. 1, 1921.

Application filed January 19, 1918. Serial No. 212,714.

*To all whom it may concern:*

Be it known that I, EDWARD H. MILLER, a citizen of the United States, residing at Los Angeles, in the county of Los Angeles and State of California, have invented new and useful Improvements in Calendar - Calculators, of which the following is a specification.

My object is to make a calendar calculator which will assist in various computations involving days of time, as for ascertaining on what date a certain number of days from a given date will fall or for ascertaining the number of days between two given dates, and my invention consists in the novel features herein shown, described and claimed.

Figure 1:
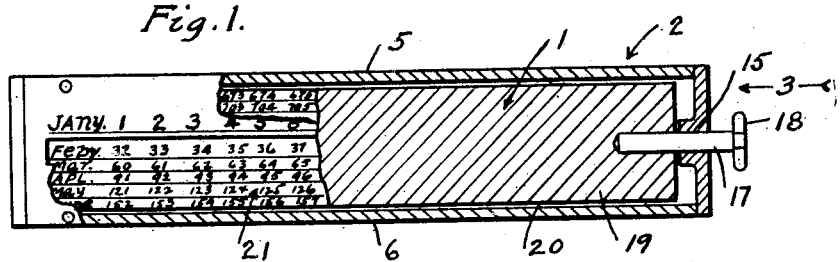
Figure 1 is a top plan view of a calendar calculator involving the principles of my invention, parts being broken away and shown in section.
Figure 2:
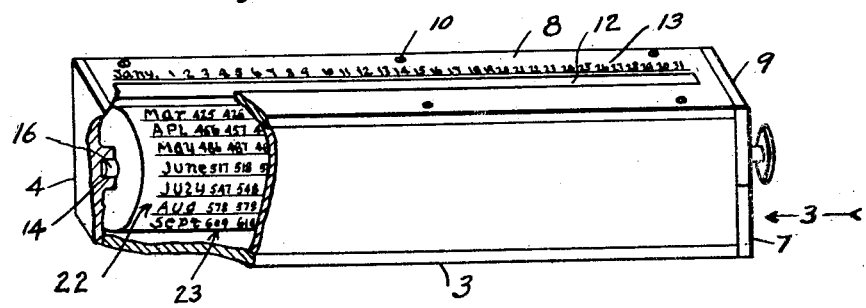
Fig. 2 is a detail perspective illustrating the construction and operation, parts of the case being broken away.
Figure 3:
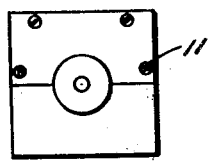
Fig. 3 is an end elevation, as seen looking in the direction indicated by the arrows 3 in Figs. 1 and 2.

The calendar roller 1 is mounted in a case 2. The case 2 consists of a flat rectangular bottom 3, a solid square end 4, solid rectangular side pieces 5 and 6, and the solid half-end 7 rigidly nailed or glued together, and the removable top 8 and the removable half-end 9 secured in place by screws 10 and 11, respectively. A longitudinal vertical slot 12 is formed at the transverse center of the top 8 and reaches nearly from end to end. A scale 13 is formed upon or pasted upon the farther side of the slot 12, said scale reading, "Jany. 1—31."

A bearing 14 is formed in the end 4 and a bearing 15 is formed in the end produced by the half-ends 7 and 9. The roller 1 is preferably a wooden cylinder fitting between the bearings 14 and 15 and has a trunnion 16 extending into the bearing 14 and a trunnion 17 extending through the bearing 15 and carrying a hand-wheel 18 on its outer end, so that by manipulating the hand-wheel 18 the roller 1 may be manipulated. The main body of the roller 1 consists of a wooden cylinder 19 or other suitable cylinder, and the paper cover 20 pasted upon the cylinder.

The computing calendar 21 is printed upon the paper 20 before the paper is applied to the cylinder, said calendar consisting of abbreviations of full names for the months, arranged in a vertical column 22, and opposite each month indication are arranged the computations 23 consisting of the serial numbers of the days in that month computed from January 1st. of the current or preceding year, and extending to the ensuing year or years.

The roller is inserted into position in the solid portion of the case and then the top 8 and half-end 9 are applied, and the lines occupied by each month will be readable through the slot 12 as the roller is operated by manipulating the hand-wheel 18. The scale 13 serves for each month to show the day of the month.

Referring to Fig. 1, the roller 1 has been operated to bring the next February from the starting point into view through the slot 12, and using the scale 13 upon the month of February we find that February 1 is the thirty-second day of the year, February 2 the thirty-third day, February 3 the thirty-fourth day, etc., and in the same way if the roller 1 is operated to expose the month of April through the slot 12 we find that April 1 is the ninety-first day of the year, April 2 the ninety-second day, etc., and if the roller 1 is operated to show the month of March of the ensuing year, we find that March 1 is the four hundred and twenty-fifth day from the starting point, January 1 of the previous year, and that June 2 is the five hundred and eighteenth day, etc.

The calculator may be made for any desired number of years, either past or future or both.

If it is desired to calculate when a note given January 4 for ninety days will expire, add ninety to four, which makes ninety-four, and by manipulating the roller 1, we find that the ninety-fourth day falls on April 4.

If, on January 5th, a man is sentenced to sixty days in jail, add sixty to five, which makes sixty-five, and by manipulating the roller 1 to March we find that the sixty-fifth day falls on March 6th.

If it is desired to find the number of days between two dates, you simply subtract the serial number of the day of the earlier date from the serial number of the day of the later date. The number of days between January 4th and March 5th will be sixty. The serial number of March 5th is sixty-four. The serial number of January 4th is four. Subtract four from sixty-four and you have sixty.

If a note is given on February 2nd for four hundred and twenty-three days, you add the serial number of February 2nd, which is thirty-three, to four hundred and twenty three and you have four hundred and fifty-six. You manipulate the roller 1 to the ensuing year until you find the serial number four hundred and fifty-six and it appears to be April 1st. In a like manner all similar calculations may be readily and accurately made.

The calendar may be made up to include February 29th, or to exclude it, and in making the calculation this fact must be considered.

Various changes may be made in the details of construction without departing from the spirit of my invention as set up in the following claims.

I claim:

1. A calendar calculator comprising a case having a longitudinal slot and a scale upon one side of the slot, and a roller mounted in the case and having the months indicated in a vertical line running around the roller and the serial numbers of the days of the months in horizontal lines which will appear and be readable through the slot as the roller is manipulated.

2. In a calendar calculator, a plate having a longitudinal slot and a scale along one side of the slot consisting of the month of January, and a roller mounted below the plate and having the months arranged in a vertical column running around the roller and the days of the months serially numbered from January first and arranged to come opposite the scale as the roller is manipulated.

In testimony whereof I have signed my name to this specification.

EDWARD H. MILLER.